G. ZOLL.
NUT LOCK.
APPLICATION FILED AUG. 24, 1908.
907,305.
Patented Dec. 22, 1908.
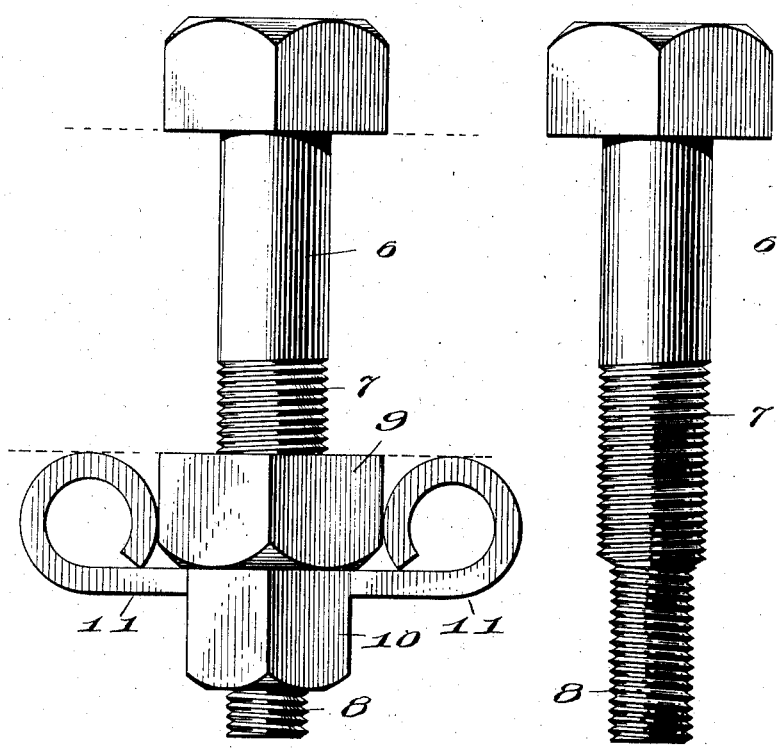
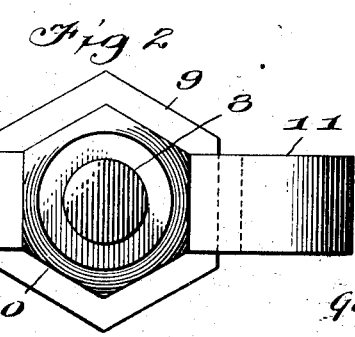
Witnesses
Inventor
George Zoll.
By
Attorney

UNITED STATES PATENT OFFICE.

GEORGE ZOLL, OF FAYETTEVILLE, TEXAS.

NUT-LOCK.

No. 907,305.  Specification of Letters Patent.  Patented Dec. 22, 1908.

Application filed August 24, 1908. Serial No. 450,004.

*To all whom it may concern:*

Be it known that I, GEORGE ZOLL, citizen of the United States, residing at Fayetteville, in the county of Fayette and State of Texas, have invented certain new and useful Improvements in Nut-Locks, of which the following is a specification.

This invention relates to nut-locks, and particularly comprises an improvement in nut-locks of that class in which two nuts are used, the bolt having opposite threads on different sections thereof, with one nut fitting on one thread and another nut fitting on the other thread, the nuts being fastened together by bending down a projection on the latter against the side of the former, said projection or projections being so constructed that they can be bent or sprung out again to permit the nuts to be released, without mutilating the bolt and without rendering the nuts useless.

The invention is illustrated in the accompanying drawings in which—

Figure 1 is a side view of the complete device; Fig. 2 is an end view; Fig. 3 is a side view of the bolt.

Referring specifically to the drawings, 6 indicates the bolt having threads 7 and 8 cut in respectively opposite directions, the latter threads being on a reduced part of the bolt.

The inner or ordinary nut is indicated at 9, and fits on the thread 7. The outer or lock nut is indicated at 10, and fits on the thread 8. This latter nut is provided at opposite sides with extensions or wings 11 which are flexible and which extend from the sides of the nut adjacent to the inner face thereof, the extensions being comparatively thin with respect to the axis of the nut, and broad laterally; the width being conveniently equal to the width of the side face of the nut. This construction enables the wings to be bent in or around in substantially circular form, as clearly shown in Fig. 1, being thus brought against the sides of the nut 9, whereby the nuts are locked together, and accordingly neither can be turned without special effort.

By means of a proper tool or instrument the outer nut may be turned by special effort, the curved form of the wings 11 allowing them to yield or to be compressed sufficiently to slip over the corners of the inner nut. So the outer or lock nut can be removed, and afterwards the inner nut. And the nuts can be replaced and used again in similar manner.

The invention will be found very effective for the intended purpose and the lock will be particularly useful for locking the nuts on the bolts connecting the fish plates of railways, where the need of an effective nut lock, which, nevertheless, can be released when desired, is especially great.

I claim:

1. In a nut-lock, the combination of a bolt having inner and outer opposite threads, and a nut on each thread, the outer nut having a wing projecting therefrom and curved to substantially circular form to contact with the side of the inner nut, the curvature of the wing permitting it to yield and slip over the corners of the inner nut on the application of special force.

2. In a nut-lock, the combination of a bolt having inner and outer opposite threads, and a nut on each thread, the outer nut having a wing projecting therefrom and curved to substantially circular form to contact with the side of the inner nut, the wing being comparatively thin and curled inwardly against the side of the inner nut, whereby it will yield for the purpose stated.

In testimony whereof, I affix my signature in presence of two witnesses.

GEORGE ZOLL.

Witnesses:
  CONRAD BERTSCH,
  CHARS. J. KLIMICEK.